United States Patent [19]

Barthrope

[11] Patent Number: 5,302,297

[45] Date of Patent: Apr. 12, 1994

[54] REMOVAL OF SCALE-FORMING INORGANIC SALTS FROM A PRODUCED BRINE

[76] Inventor: Richard T. Barthrope, 8889 W. Fremont Ave., Littleton, Colo. 80123

[21] Appl. No.: 23,277

[22] Filed: Feb. 26, 1993

[51] Int. Cl.$^5$ ................................................. C02F 1/58
[52] U.S. Cl. ......................................... 210/728; 210/747; 210/702; 423/158; 423/166; 423/2; 252/631
[58] Field of Search ............... 210/697, 698, 699, 700, 210/702, 724, 725, 726–728, 747; 423/158, 166; 252/631

[56] References Cited

U.S. PATENT DOCUMENTS 5,093,020  3/1992  Paul et al. .......................... 210/699

Primary Examiner—Neil M. McCarthy

[57] ABSTRACT

A treatment process is provided for removing a scale-forming inorganic salt from a produced brine having a scale inhibitor and the inorganic salt dissolved therein. The process is initiated by adding an interfering agent to the produced brine which disrupts the function of the scale inhibitor, thereby enabling formation of an insoluble inorganic salt precipitate. The precipitate is readily separable from the aqueous brine.

23 Claims, No Drawings

REMOVAL OF SCALE-FORMING INORGANIC SALTS FROM A PRODUCED BRINE

TECHNICAL FIELD

The present invention relates to treatment of a brine produced from a subterranean hydrocarbon-bearing reservoir and more particularly to a treatment process for removal of scale-forming inorganic salts from a produced brine.

BACKGROUND OF THE INVENTION

The precipitation of inorganic salts, such as alkaline earth metal sulfates, from produced brines to form scale is a persistent and common problem encountered during the production of hydrocarbons from subterranean reservoirs. Scale deposition in the reservoir, in the hydrocarbon production well bore penetrating the reservoir, and in surface and subsurface production equipment and tubing is typically caused by commingling incompatible fluids in situ and producing the resulting brine during hydrocarbon recovery operations, especially during enhanced oil recovery (EOR) operations involving waterflooding or a water drive.

Aqueous fluids are deemed incompatible if each fluid contains distinct ions which ultimately form a precipitate that deposits as a scale when the fluids are commingled. A common example of two incompatible fluids is a connate water containing naturally-occurring alkaline earth metal cations and an EOR injection water containing naturally-occurring sulfate anions. Offshore operations often involve the injection of large volumes of sea water containing relatively high concentrations of sulfate anions into subterranean reservoirs containing connate water with relatively high concentrations of alkaline earth metal cations. Upon in situ mixing of the sea water and connate water, precipitation of alkaline earth metal sulfate scale often occurs in the reservoir, in the well bore, or in surface and subsurface production tubing and equipment.

To remedy the problem of scale deposition, conventional commercial scale inhibitors, primarily comprising polyelectrolytes such as polycarboxylates or polyphosphonates, are added to the brine in situ. The scale inhibitors advantageously maintain the inorganic salt in solution and prevent precipitation of the scale-forming salt from the produced brine during hydrocarbon production operations. Nevertheless, it is often desirable to precipitate and separate the inorganic salts from the produced brine after production of the hydrocarbons, particularly where the inorganic salt is radioactive, to reduce the disposal load. Unfortunately, the downstream presence of a scale inhibitor in the produced brine maintains the inorganic salt in solution and hinders separation of the inorganic salt from the brine.

Accordingly, it is an object of the present invention to provide a process for removing an inorganic salt from an aqueous brine. It is further an object of the present invention to provide a process for removing an inorganic salt from an aqueous brine in the presence of a scale inhibitor. It is a yet another object of the present invention to provide a process for removing an inorganic salt from an aqueous brine produced from a subterranean hydrocarbon-bearing reservoir, wherein the salt is a radioactive alkaline earth metal salt.

SUMMARY OF THE INVENTION

The present invention is a treatment process for removing a scale-forming inorganic salt from an aqueous brine. The process is specifically directed to treatment of an aqueous brine produced from a subterranean hydrocarbon-bearing reservoir, wherein the produced brine has a scale-forming inorganic salt and a scale inhibitor dissolved therein. Such brines are typically admixtures of connate water and injected sea water containing naturally-occurring inorganic salt ions wherein the admixture has been treated with an artificially-introduced polyelectrolyte to inhibit the growth of scale-forming crystalline salt precipitates in the brine.

Although the presence of a scale inhibitor in the brine substantially reduces the undesirable accumulation of scale in the reservoir and in surface and subsurface production tubing and equipment in fluid communication with the reservoir, the presence of the scale inhibitor also hinders desirable downstream removal of the inorganic salt from the brine. Accordingly, the present process is designed to treat the brine after it has been produced from the reservoir via the production well bore and removed from the production tubing and equipment.

The treatment process is initiated by adding an interfering agent to the produced brine having the salt and scale inhibitor dissolved therein. The interfering agent is typically an organic anion, such as found in organic acids, that disrupts the function of the scale inhibitor, thereby enabling accelerated crystal growth of the inorganic salt in the brine and formation of an insoluble inorganic salt precipitate. The insoluble inorganic salt precipitate is readily separable from the produced aqueous brine.

The present treatment process is particularly suited to the removal of radioactive inorganic salts, such as radium sulfate, from produced brines. By separating the radioactive salt from the brine prior to handling and disposal thereof, the brine is rendered substantially non-radioactive and the total volume of radioactive material is significantly reduced relative to the volume of the entire brine solution. Consequently, the cost of handling and disposing the radioactive material is reduced.

DESCRIPTION OF PREFERRED EMBODIMENTS

The present invention relates to a treatment process utilizing an interfering agent to facilitate the removal of a scale-forming inorganic salt from an aqueous brine solution. The process is particularly effective for treatment of a brine having a scale inhibitor dissolved therein, which hinders removal of the salt from the brine. Such brines are often produced from hydrocarbon-bearing reservoirs during or after a waterflood, wherein the hydrocarbon-bearing reservoir has undergone a scale inhibition treatment.

Brines having utility in the present invention are aqueous solutions of inorganic salts capable under specific conditions of sufficient crystal growth to precipitate from the solution in the form of scale. As used herein, the term "salt solution" comprises dissociated salt cations and salt anions dissolved in an aqueous solvent, or associated salt crystals dissolved in an aqueous solvent which have not reached a sufficient threshold size to precipitate from the solvent, or mixtures of both dissociated salt ions and associated salt crystals dissolved in the aqueous solvent.

Scale-forming inorganic salts are commonly salts of alkaline earth metal cations and sulfate or carbonate anions, although other scale-forming inorganic salts are possible within the scope of the present invention. Such salts, or precursor ions thereof, are typically found at various naturally-occurring concentrations in connate water and/or sea water. The present invention is particularly suited to the removal of radioactive inorganic salts from aqueous brines and, more particularly, to the removal of radium sulfate from aqueous brines.

The scale inhibitor is substantially any composition soluble in the brine that is known to prevent or substantially inhibit the formation of scale by retarding precipitation of the inorganic salt. Known scale inhibitors are typically polyelectrolytes selected from the group consisting of phosphonates, polycarboxylates (including polycarboxylic acids and polyacrylates), phosphate esters, and polysulfonates (including polyvinylsulfonates). Polyelectrolyte scale inhibitors are employed in the brine at concentrations on the order of about 50 ppm or more, and generally within a range between about 50 and 100 ppm. Accordingly, the present process is preferably adapted to treat brines having polyelectrolyte concentrations within these ranges, although the invention is not so limited.

U.S. Pat. No. 5,092,404, which is incorporated herein by reference, describes the parameters of a conventional scale inhibition treatment, wherein a polyelectrolyte scale inhibitor is introduced into a brine rendering the brine suitable for treatment by the process of the present invention. It is believed that scale inhibitors impede scale formation by attaching to the growth sites of inorganic salt crystals in solution, thereby retarding the ability of the crystals to reach a threshold size needed for precipitation and scale formation.

In the practice of the present treatment process, an interfering agent is added to the aqueous brine having an inorganic salt and scale inhibitor dissolved therein, preferably in such a manner that the interfering agent is uniformly dispersed in solution throughout the brine. The interfering agent is a composition capable of substantially disabling the scale inhibitor, thereby enabling formation of insoluble inorganic salt precipitates in the brine solution.

Interfering agent compositions satisfying the above-recited criteria are organic anions as are typically found in certain organic acids, such as polyaminocarboxylic acids including ethylenediamine tetraacetic acid (EDTA), citric acids, gluconic acids, mixtures thereof, and derivatives thereof. These organic acids are among a class of species termed organic chelants, defined herein as organic species capable of forming polydentate ligands. However, it is not required that the organic acids having utility herein perform as chelants in the present process.

The interfering agent is capable of performing its above-stated function at trace concentrations in the brine as low as 0.001 ppm. An effective concentration range of the interfering agent in the brine is generally, however, between about 0.01 ppm and about 100 ppm, and preferably between about 0.1 ppm and about 10 ppm, although other interfering agent concentrations are possible within the scope of the present invention outside of these ranges. The interfering agent is effective within a neutral to acidic pH range less than about 6.0 and preferably within an acidic pH range less than about 4.0, insofar as the aqueous brine typically has an acidic downhole pH of less than about 6.0 and often less than about 4.0, while the brine has a relatively neutral topside pH of about 6.0.

Although it is not known, it is believed that the present treatment process is the result of a surface adsorption mechanism. According to this mechanism, the interfering agent competes with the scale inhibitor for growth sites at the surface of the inorganic salt crystal. The physical and chemical character of the interfering agent renders it sufficiently labile to rapidly skip between a large number of growth sites on the crystal surface alternately adsorbing and desorbing from these sites. In doing so, the interfering agent prevents the inhibitor from reaching the growth sites to block crystal growth, thereby permitting crystal growth to proceed beyond the threshold size required for precipitate formation at a substantially full pace.

When the inorganic salt crystals reach the threshold size of precipitation, they precipitate out of the brine solution. The inorganic salt precipitate is then separated from the aqueous brine by conventional means such as gravity separation or the like. The resulting solid can then be reclaimed or disposed as desired, while the brine can be reinjected into the reservoir or otherwise utilized or disposed.

The present treatment process is advantageously performed on a produced brine after it has cleared the production well bore and the production tubing and equipment at the wellhead to avoid significant deposition of inorganic salt scale therein. More particularly, the treatment process is most advantageously performed after the produced brine has been removed from the production stream for disposal, reinjection or any other desired application. The process is most advantageously directed to the removal of radioactive inorganic salts from a produced brine being readied for disposal, thereby reducing the radioactive disposal load.

The invention has been described above, wherein the polyelectrolyte is introduced into the aqueous brine for the purpose of scale inhibition. It is understood, however, that the present invention is not so limited and applies likewise to brine treatment processes wherein the polyelectrolyte is introduced into the brine for substantially any purpose.

The following examples demonstrate the practice and utility of the present invention, but are not to be construed as limiting the scope thereof.

EXAMPLE 1

A number of identical synthetic brine pairs are prepared for treatment by the process of the present invention. The first brine of each pair is a cation brine simulating a reservoir brine that is rich in alkaline earth metal cations. The second brine is an anion brine simulating a sea water that is rich in sulfate anions. The cation brine has a $BaCl_2.2H_2O$ concentration of 2.177 g/l and the anion brine has an $Na_2SO_4$ concentration of 1.567 g/l.

The pH of each brine pair is adjusted to a predetermined value. In addition, a scale inhibitor and an interfering agent are added to the anion brine of each inhibitor and/or interfering agent between the pairs.

Brine samples are prepared from the brine pairs by combining the cation brine with the anion brine of each pair in glass culture tubes along with a dry barium sulfate seed. Accordingly, each brine sample is an admixture of about 5 mg of a barium sulfate seed as well as a cation brine and an anion brine in equal 5 ml volumes to simulate a produced brine with a $Ba/SO_4$ molar ratio of 0.85 and a make up of 80% reservoir brine and 20% sea water. Each brine sample further has a different value of one of the following variables: inhibitor (inhbtr) type, inhibitor concentration, interfering agent (intf agt) type, interfering agent concentration, and pH. Blank brine samples are also prepared, having the same variables as the above-recited samples except that the interfering agent is omitted from the blank samples.

Once the brine samples are prepared in the culture tubes, the tubes are sealed and placed in a shaker bath that is maintained at 85° C. The tubes are removed from the bath after 1 hour and the concentration of free barium ions in the samples are analytically determined. The scale inhibitor performance in each sample is then calculated from the values of initial, final and equilibrium barium ion concentrations and expressed in terms of % inhibition. This parameter inversely correlates to the degree of scale inhibitor impairment due to the interfering agent in accordance with the treatment process of the present invention.

The results are set forth in Table 1 below. All concentrations (conc) in Table 1 are expressed in milligrams per liter.

TABLE 1

| intfg agt type: | | | blank | citric acid | | | gluconic acid | | | EDTA | | |
|---|---|---|---|---|---|---|---|---|---|---|---|---|
| intfg agt conc: | | | 0 | 0.1 | 1.0 | 10.0 | 0.1 | 1.0 | 10.0 | 0.1 | 1.0 | 10.0 |
| inhbtr type | inhbtr conc | pH | | | | | % INHIBITION | | | | | |
| 1 | 50 | 4 | 16 | 3 | 3 | 2 | 1 | 1 | 7 | 2 | 2 | 1 |
| 1 | 100 | 4 | 28 | 3 | 3 | 1 | 2 | 6 | 9 | 4 | 1 | 1 |
| 1 | 50 | 6 | 45 | 27 | 26 | 33 | 10 | 3 | 19 | 21 | 28 | 31 |
| 1 | 100 | 6 | 72 | 16 | 15 | 6 | 16 | 10 | 4 | 20 | 14 | 15 |
| 2 | 50 | 4 | 48 | | | 36 | | | 64 | | | 45 |
| 2 | 100 | 4 | 59 | | | 44 | | | 59 | | | 46 |
| 2 | 50 | 6 | 67 | | | 74 | | | 71 | | | 69 |
| 2 | 100 | 6 | 71 | | | 77 | | | 76 | | | 73 |
| 3 | 50 | 4 | 7 | 1 | 2 | 2 | 2 | 2 | 2 | 1 | 2 | 2 |
| 3 | 100 | 4 | 15 | 4 | 5 | 5 | 3 | 6 | 4 | 1 | 3 | 3 |
| 3 | 50 | 6 | 16 | 4 | 4 | 3 | 6 | 5 | 5 | 12 | 5 | 3 |
| 3 | 100 | 6 | 33 | 11 | 1 | 3 | 13 | 0 | 1 | 6 | 0 | 7 |
| 4 | 50 | 4 | 5 | 2 | 1 | 2 | 2 | 2 | 2 | 2 | 1 | 2 |
| 4 | 100 | 4 | 11 | 3 | 5 | 1 | 4 | 5 | 5 | 4 | 2 | 4 |
| 4 | 50 | 6 | 22 | 2 | 1 | 2 | 3 | 2 | 4 | 3 | 2 | 3 |
| 4 | 100 | 6 | 35 | 5 | 6 | 6 | 7 | 8 | 14 | 5 | 4 | 7 | inhbtr type 1 = phosphinocarboxylate
inhbtr type 2 = polyvinylsulfonate
inhbtr type 3 = amine phosphate ester
inhbtr type 4 = DETA phosphonate The results of Table 1 indicate that the interfering agents of the present invention are capable of impairing the scale inhibiting effect of the tested inhibitors, thereby enabling precipitation of barium sulfate in a brine having an ionic excess of sulfate. Impairment of the phosphonate, polycarboxylate, and phosphate ester inhibitors is particularly profound in this case, even at relatively low interfering agent concentrations.

EXAMPLE 2

Identical synthetic brine pairs are prepared for treatment by the process of the present invention. The brine pairs are substantially the same as those of Example 1 except that the cation brine has a $BaCl_2 \cdot 2H_2O$ concentration of 2.313 g/l and the anion brine has an $Na_2SO_4$ concentration of 1.176 g/l.

The pH of each brine pair is adjusted and a phosphinocarboxylate scale inhibitor and a citric acid interfering agent are added to the anion brine of each pair, differing the pH, inhibitor concentration, or interfering agent concentration between the pairs.

Brine samples are prepared and treated in the same manner as Example 1, wherein each brine sample simulates a produced brine with a $Ba/SO_4$ molar ratio of 1.15 and a make up of 85% reservoir brine and 15% sea water. The scale inhibitor performance in each sample is set forth in Table 2 below. All concentrations (conc) in Table 2 are expressed in milligrams per liter.

TABLE 2

| intfg agt type: | | | blank | citric acid | | |
|---|---|---|---|---|---|---|
| intfg agt conc: | | | 0 | 0.1 | 1.0 | 10.0 |
| inhbtr type | inhbtr conc | pH | | | % INHIBITION | |
| 1 | 50 | 4 | 11 | 7 | 7 | 4 |
| 1 | 100 | 4 | 21 | 19 | 20 | 10 |
| 1 | 50 | 6 | 45 | 46 | 46 | 24 |
| 1 | 100 | 6 | 75 | 68 | 65 | 31 |

The results of Table 2 show the utility of the present treatment process for a brine having an ionic excess of barium.

While the forgoing preferred embodiments of the invention have been described and shown, it is understood that alternatives and modifications, such as those suggested and others, may be made thereto and fall within the scope of the invention.

I claim:
1. A process for removing scale-forming inorganic salts from a brine comprising:
   providing a brine having an inorganic salt and a scale inhibitor dissolved therein, wherein said scale inhibitor substantially inhibits precipitation of said inorganic salt;
   adding an organic chelant having at least one carboxylic acid group to said brine in an amount sufficient to induce precipitation of said inorganic salt in the presence of said scale inhibitor; and
   precipitating said inorganic salt from said brine.
2. A process for removing scale-forming inorganic salts from a brine as recited in claim 1 further comprising separating said precipitated inorganic salt from said aqueous brine.
3. A process for removing scale-forming inorganic salts from a brine as recited in claim 1 wherein said inorganic salt comprises a cation selected from the alkaline earth metals.

4. A process for removing scale-forming inorganic salts from a brine as recited in claim 3 wherein said cation is radium.

5. A process for removing scale-forming inorganic salts from a brine as recited in claim 1 wherein said inorganic salt comprises a sulfate anion.

6. A process for removing scale-forming inorganic salts from a brine as recited in claim 1 wherein said scale inhibitor is a polyelectrolyte.

7. A process for removing scale-forming inorganic salts from a brine as recited in claim 6 wherein said polyelectrolyte is selected from the group consisting of phosphonates, polycarboxylates, phosphate esters, polysulfonates, and mixtures thereof.

8. A process for removing scale-forming inorganic salts from a brine as recited in claim 1 wherein said organic chelant comprises an organic anion of a polycarboxylic acid.

9. A process for remvoing scale-forming inorganic salts from a brine as recited in claim 8 wherein said polycarboxylic acid is selected from the group consisting of citric acid, EDTA, gluconic acid, mixtures thereof, and derivatives thereof.

10. A process for removing scale-forming inorganic salts from a brine as recited in claim 1 wherein said has a pH less than about 6.

11. A process for removing scale-forming inorganic salts from a brine as recited in claim 1 wherein said chelant is added to said brine in a concentration as low as about 0.01 ppm.

12. A process for removing scale-forming inorganic salts from a brine produced from a subterranean hydrocarbon-bearing reservoir, said brine having been treated with a polyelectrolyte to inhibit inorganic salt scale formation by inhibiting precipitation of said inorganic salt in said reservoir, in a hydrocarbon production well bore penetrating said reservoir, or in surface or subsurface hydrocarbon production tubing and equipment in fluid communication with said reservoir, the process comprising:
   adding an organic anion of a polycarboxylic acid to a produced brine having an inorganic salt and a polyelectrolyte dissolved therein, wherein said organic anion is added in an amount sufficient to induce precipitation of said inorganic salt in the presence of said scale inhibitor; and
   contacting said inorganic salt with said organic anion to precipitate said inorganic salt from said brine.

13. A process for removing scale-forming inorganic salts from a brine as recited in claim 12 further comprising separating said precipitated inorganic salt from said produced brine.

14. A process for removing scale-forming inorganic salts from a brine as recited in claim 12 wherein said inorganic salt comprises a cation selected from the alkaline earth metals.

15. A process for removing scale-forming inorganic salts from a brine as recited in claim 12 wherein said inorganic salt comprises a sulfate anion.

16. A process for removing scale-forming inorganic salts from a brine as recited in claim 12 wherein said polyelectrolyte is selected from the group consisting of phosphonates, polycarboxylated, phosphate esters, polysulfonates, and mixtures thereof.

17. A process for removing scale-forming inorganic salts from a brine as recited in claim 12 wherein said polycarboxylic acid is selected from the group consisting of citric acid, EDTA, gluconic acid, mixtures thereof, and derivatives thereof.

18. A process for removing scale-forming inorganic salts from a brine as recited in claim 12 wherein said polycarboxylic acid is a chelant.

19. A process for removing scale-forming inorganic salts from a brine as recited in claim 12 wherein said brine has a pH less than about 6.

20. A process for remvoing scale-forming inorganic salts from a brine as recited in claim 12 wherein said organic anion of said polycarboxylic acid is added to said produced brine in a concentration as low as about 0.01 ppm.

21. A process for removing a scale-forming inorganic salt from a brine produced from a subterranean hydrocarbon-bearing reservoir, said produced brine having been treated with a polyelectrolyte to inhibit inorganic salt scale formation by inhibiting precipitation of said inorganic salt in said reservoir, in a hydrocarbon production well bore penetrating said reservoir, or in surface of subsurface hydrocarbon production tubing and equipment in fluid communication with said reservoir, the process comprising:
   adding an organic anion of an organic acid selected from the group consisting of citric acid, EDTA, gluconic acid, mixtures thereof, and derivatives thereof to a produced brine having an inorganic salt and a polyelectrolyte dissolved therein, wherein said inorganic salt is a sulfate salt of an alkaline earth metal, and further wherein said organic anion is added in an amount sufficient to induce precipitation of said inorganic salt in the presence of said scale inhibitor; and
   contacting said inorganic salt with said organic anion to precipitate said inorganic salt from said brine.

22. A process for removing scale-forming inorganic salts from a brine as recited in claim 21 further comprising separating said precipitated inorganic salt from said produced brine.

23. A process for removing scale-forming inorganic salts from a brine as recited in claim 21 wherein said polyelectrolyte is selected from the group consisting of phosphonates, polycarboxylates, phosphate esters, polysulfonates and mixtures thereof.

* * * * *

UNITED STATES PATENT AND TRADEMARK OFFICE
CERTIFICATE OF CORRECTION

PATENT NO. : 5,302,297

DATED : April 12, 1994

INVENTOR(S) : Richard T. Barthorpe

It is certified that error appears in the above-identified patent and that said Letters Patent is hereby corrected as shown below:

Col. 4, lines 60-61: After "each" insert --pair, differing the type and/or concentration of the--.
Col. 6, line 15: Insert --inhbtr type 1 = phosphinocarboxylate--.
Col. 6, line 56: Delete "acid".

Signed and Sealed this

Ninth Day of August, 1994

Attest:

BRUCE LEHMAN

Attesting Officer

Commissioner of Patents and Trademarks